United States Patent
Radanovic et al.

(10) Patent No.: US 11,592,044 B2
(45) Date of Patent: Feb. 28, 2023

(54) DEVICE FOR COMPENSATING OF TOLERANCES BETWEEN A FIRST COMPONENT AND A SECOND COMPONENT

(71) Applicant: WITTE Automotive GmbH, Velbert (DE)

(72) Inventors: Vladimir Radanovic, Cologne (DE); Pavel Vrsecky, Chodov (CZ)

(73) Assignee: Witte Automotive GmbH, Velbert (DE)

( * ) Notice: Subject to any disclaimer, the term of this patent is extended or adjusted under 35 U.S.C. 154(b) by 420 days.

(21) Appl. No.: 16/857,223

(22) Filed: Apr. 24, 2020

(65) Prior Publication Data
US 2020/0355207 A1    Nov. 12, 2020

(30) Foreign Application Priority Data

May 9, 2019    (DE) .................... 10 2019 206 750.6

(51) Int. Cl.
*F16B 5/02*    (2006.01)

(52) U.S. Cl.
CPC ............ *F16B 5/025* (2013.01); *F16B 5/0266* (2013.01)

(58) Field of Classification Search
CPC ...... F16B 5/025; F16B 5/0233; F16B 5/0225; F16B 37/044
See application file for complete search history.

(56) References Cited

U.S. PATENT DOCUMENTS

| | | | | |
|---|---|---|---|---|
| 4,929,136 A * | 5/1990 | Mee | ...................... | F16B 35/047 411/432 |
| 6,092,953 A * | 7/2000 | Chaptal | ................. | F16B 5/0241 296/29 |
| 7,895,709 B2 * | 3/2011 | Shishikura | .............. | B60R 13/04 411/335 |
| 8,992,150 B2 * | 3/2015 | Korn | ...................... | F16B 41/002 411/352 |
| 2020/0208661 A1 * | 7/2020 | Wilke | ................... | F16B 5/0233 |
| 2020/0325685 A1 * | 10/2020 | Figge | ........................ | E04B 1/40 |
| 2021/0317865 A1 * | 10/2021 | Goldstein | ............. | F16B 39/282 |

FOREIGN PATENT DOCUMENTS

| | | |
|---|---|---|
| CN | 102138011 A | 7/2011 |
| CN | 103747982 A | 4/2014 |
| CN | 103994131 A | 8/2014 |
| CN | 107949708 A | 4/2018 |
| DE | 20120873 U1 | 4/2003 |
| DE | 102012221679 A1 | 5/2014 |
| DE | 102016120650 A1 | 5/2018 |
| EP | 1 741 938 A1 * | 1/2001 |
| EP | 1593859 A2 | 11/2005 |

OTHER PUBLICATIONS

German Patent and Trademark Office, Office Action in Application No. 10 2019 206 750.6, dated Feb. 19, 2020, 7 pages. Munich, Germany.
The China National Intellectual Property Administration, Office Action in Application No. CN 202010331251.3, dated Jul. 5, 2021, 8 pages.

* cited by examiner

*Primary Examiner* — Flemming Saether

(74) *Attorney, Agent, or Firm* — Marshall & Melhorn, LLC

(57) ABSTRACT

A device for compensating of tolerances between a first component and a second component is described. The device may have an elastic centering arrangement which is provided for centering the device in a nominal position on the first component, which may be formed for this purpose.

8 Claims, 9 Drawing Sheets

DEVICE FOR COMPENSATING OF TOLERANCES BETWEEN A FIRST COMPONENT AND A SECOND COMPONENT

The invention relates to a device for compensating of tolerances between a first component and a second component.

BACKGROUND

Such a device is basically known and is used, for example, in vehicle construction, especially when two components need to be bolted together across a tolerance-affected joint gap. For this purpose, the device is placed between the components to be joined and a screw member for screwing the components, for example a screw or threaded bolt, is passed through correspondingly provided openings in the components and through the device. When screwing the screw member, the compensating member is twisted relative to the base member by means of a driving spring connected between the screw member and the compensating member and is thus moved from its starting position axially to the base member, e.g. it is moved out of the base member until it reaches its compensating position, in which the base member and the compensating member each lie against one of the components and thus bridge the joint gap.

Furthermore, devices for compensating of tolerances in a distance between a roof plate (=first component) of the vehicle and a support structure (=second component) located underneath it in the direction of a longitudinal central axis are known, in particular for mounting a railing on a roof of a vehicle. For this purpose, the device is clipped by means of a fastening member into a recess provided for this purpose in the roof plate and the compensating member unscrewed from the base member until it is supported at the bottom on the support structure below and the clip arms of the fastening member under the roof plate are supported at the top on the roof plate. The fastening member accommodates the first component between the cliparm and a counter bearing, which extends radially outwards from the base body and is inclined towards the cliparms. A portion of the base member protrudes upwards beyond the roof plate and forms a contact surface for the railing to be mounted. So that the device can be easily clipped into the recess in the roof cladding, the clip arms of the fastening member are comparatively soft. At the same time, the device should be firmly supported on both components in a mounted state, which is why the compensating member is unscrewed further out of the base member even if it is already engaged with the support structure, which can result in yielding of the cliparms. To avoid this, a spreading protection is provided which prevents a deflection of the cliparm from its rest position in a direction away from the base body.

The object is solved according to the invention by a device for compensating of tolerances between a first component and a second component with the features of the claims.

The object is solved according to the invention by a device for compensating of tolerances between a first component and a second component with the features of claim 1.

Advantageous embodiments of the invention are the object of the dependent claims.

SUMMARY

A device according to the invention for compensating of tolerances between a first component and a second component comprises an elastic centering arrangement which is provided for centering the device in a predetermined nominal position on the first component, in particular is formed for this purpose. The elastic centering arrangement is in particular formed as an elastic contour and/or an elastic body.

The solution, according to the invention, ensures that the device is always in the nominal position during mounting, in particular in every possible installation position of the device, as it is held in the nominal position by the elastic centering arrangement, in particular by a spring force of the elastic centering arrangement. This makes the fitting considerably easier. Particularly in unfavorable mounting positions, in which no direct view of the device and/or the first component and/or a screw member of the device is possible, whereby, for example, the screw member has to be inserted into the device accordingly without a direct view and/or a tool has to be guided without a direct view of the screw member, in particular of a screw head of the screw member, the mounting is considerably facilitated by the solution, according to the invention, as this ensures that the device, and thus also the screw member, is always in the same position. For example, this avoids a complex searching of the screw member, especially the screw head, for example by manual palpation, and a correspondingly complex positioning of the tool on the screw member.

In particular, the elastic centering arrangement is formed such that the actual function of the device, i.e. the compensating of tolerances between the first component and the second component, is not affected by the elastic centering arrangement. In particular, the elastic centering arrangement is formed in such a way that lateral forces do not negatively influence the tolerance compensation, in particular the function of the device, in particular the unscrewing of a compensating member. Therefore, the elasticity of the elastic centering arrangement is advantageously predetermined such that a force, which is required for the elastic shaping of the elastic centering arrangement or of a region of the elastic centering arrangement opposing a weight force of the device, is just sufficient to keep the device in the nominal position against its weight force. The elastic centering arrangement is thus advantageously formed in such a way that the spring forces of the elastic centering arrangement resulting from the elasticity only compensate for the weight of the device and thus keep the device in equilibrium in the nominal position, especially on the first component.

In a possible embodiment, the elastic centering arrangement is arranged or formed on a fastening member, in particular one intended for fastening the device to the first component. The fastening member is already a component of the device, it is used in particular for arranging and holding the device on the first component. However, the device is not, at least not in all directions, firmly fastened to the first component. Due to the arrangement or design of the elastic centering arrangement on this fastening member, an additional component is avoided, thus reducing the fitting effort of the device. In addition, the fastening member with the elastic centering arrangement now also fulfills the task of centering the device in the nominal position, i.e. the device is simultaneously held on the first component by the fastening member and centered in the nominal position, so that subsequent further mounting, as described above, is considerably simplified.

In a possible embodiment, the elastic centering arrangement comprises a plurality of elastic centering members. This enables, for example, the device to be supported in several directions by means of the elastic centering arrangement, which ensures centering in the nominal position, for example, independently of a particular installation position of the device. The device is thus advantageously centered in the nominal position in every possible installation position of the device. Furthermore, this means that, for example, exact alignment of the elastic centering arrangement and/or the device is not necessary, to, for example, ensure that the weight force of the device is always supported by the elastic centering arrangement. This requires in particular the spring force of at least one elastic centering member aligned downwards, wherein this spring force caused by the elasticity of this centering member then acts upwards and thus counteracts the weight force of the device. By providing several such elastic centering members, it is ensured that at least one of these elastic centering members is always aligned downwards, or at least this is facilitated. It is therefore advantageously also provided that the elastic centering members are arranged or formed to be distributed over a circumference, in particular the outer circumference, of the fastening member, in particular of an annular and/or hollow cylindrical base body of the fastening member.

The elastic centering members are advantageously arranged and formed, in particular in such a number and/or distribution, in particular over the circumference, in particular outer circumference, of the fastening member, that in the state of the device arranged on the first component a polygon of forces acting through the centering members on the first component always remains closed and/or centering forces of the elastic centering members always compensate each other. As a result, the device is safely centered in the nominal position. In addition, negative influences on the function of the device, i.e. on the execution of the tolerance compensation, are avoided.

The elastic centering members are, for example, each formed as a tongue, wherein a respective tongue root is arranged on the outer circumference of the fastening member, the respective tongue extends, at least substantially, in a circumferential direction of the fastening member, in particular of the base body, the respective tongue is thus formed curved in this circumferential direction, and a tongue tip has a maximum radial distance from the outer circumference of the fastening member, in particular of the base body. The elastic centering members are thus each arranged in a spiral or spiral portion on the fastening member, in particular on the base body. They are thus each formed as a bending spring, in particular as a bending spring curved in the bending direction and thus in the spring tensioning direction. In this way a particularly good elasticity and thus spring force of the elastic centering members and a particularly good centering effect in the nominal position is achieved in a particularly simple manner, wherein, advantageously, the arranging of the device in this nominal position, especially on the first component, is not hindered by the elastic centering members.

In a possible embodiment, the fastening member comprises at least one holding structure, in particular a mounting clip and/or latching member, for arranging the device on the first component, in particular by clipping and/or latching to the first component. This allows the device to be arranged and held on the first component.

In a possible embodiment, the device comprises a hollow cylindrical base member which defines a longitudinal central axis, and a hollow cylindrical compensating member in threaded engagement with the base member. This is advantageous for tolerance compensation between the first component and the second component. For this purpose, the compensating member is advantageously unscrewed from the base member until the compensating member abuts one of the components, in particular the second component, and the base member and/or the fastening member connected to it abuts the other component, in particular the first component. The fastening member can, for example, be firmly connected to the base member or formed integrally with it. Alternatively, it can be provided, for example, that the fastening member is connected to the base member in a movable manner, in particular movable parallelly to the longitudinal central axis. In a further embodiment, it can, for example, be provided that the fastening member is connected to the base member via a connecting member, for example fixedly connected or movably, in particular movably parallel to the longitudinal central axis, connected to the base member. The movable connection of the fastening member with the base member can be realized, for example, by a movable connection of the fastening member with the connecting member and/or by a movable connection of the connecting member with the base member. The respective connection of fastening member and base member depends, for example, on the respective design and/or function of the device.

It is advantageous, particularly in order to be able to carry out tolerance compensation, that the compensating member can be moved from an initial position to a compensating position by rotating it relative to the base member. Advantageously, a screw member extending through an inner hollow of the base member and an inner hollow of the compensating member is provided for screwing to the first component. In the inner hollow of the compensating member, a driving member is advantageously arranged, which is in frictional engagement with the screw member passed through the hollows in such a way that a torque applied by the screw member can be transmitted to the compensating member. This allows for a simple and reliable compensating of tolerances of an installation space between the first component and the second component, because the screw member engages with the driving member, so that when the screw member is twisted, for example clockwise, for screwing the components, a torque is transmitted through the driving member to the compensating member, which causes a twist of the compensating member relative to the base member, whereby the compensating member moves out of the base member along the longitudinal central axis. As soon as the compensating member has been screwed out of the base member to such an extent that a contact portion of the latter is in contact with the second component, a frictional torque between the second component and the contact portion exceeds the torque transmittable by the driving member and the compensating member is not any further screwed out of the base member. The compensating member has thus taken up a position known as the compensating position. For example, the components can now be attached to each other by further screwing the screw member, now into the first component, or a third component can be fastened to the first component and/or second component.

For the design of the elastic centering arrangement, in particular the elastic centering members, and advantageously also the fastening member, in particular a material is used which, at least in a molten state, has a good flow behavior. In particular, an appropriate plastic is used for this. The elastic centering arrangement is manufactured, advantageously together with the fastening member, especially in an injection molding method, especially in a plastic injection molding method. For this purpose, a good flow behavior of the material used, in particular the plastic used, is particularly advantageous in order to ensure a good flow of the material into an injection mold, in particular filling all the intended cavities of the injection mold, and thus ensuring a good result of the injection molding method.

In particular, the elastic centering arrangement is formed in such a way that neither a fitting of the device, i.e. an assembly of the device, nor a fitting of the device to the first component, for example to a bearing bracket of a vehicle, is impaired by the elastic centering arrangement.

The centering of the device described here by means of its elastic centering arrangement in the nominal position on the first component, in particular in a receiving recess of the first component provided for receiving the device, occurs, in particular, in the radial direction of the device, in particular in the radial direction of its fastening member, and thus in particular radially to the longitudinal central axis. The elastic centering arrangement is thus in particular formed accordingly and is arranged or formed on the device, in particular on its fastening member. I.e. the elastic centering arrangement is in particular formed and arranged or formed on the device, in particular on its fastening member, in such a way that the device can be centered, in particular is centered, by means of the elastic centering arrangement in the nominal position on the first component, in particular in the receiving recess of the first component provided for receiving the device, in the radial direction of the device, in particular in the radial direction of its fastening member, and thus in particular radially to the longitudinal central axis.

Advantageously, the elastic centering arrangement also enables a centering of the device on the first component if the device is arranged on the first component in such a way that its longitudinal central axis deviates from the vertical axis, i.e. is not vertically aligned, but is in particular horizontally or at least substantially horizontally aligned. For example, this is the case when the first component is arranged in an alignment deviating from the horizontal, in particular in a vertical or at least substantially vertical alignment, and/or when the device is arranged laterally, in particular on a lateral wall of the first component. In particular with such a horizontal alignment of the longitudinal central axis of the device, the weight force of the device acts in its radial direction, in particular in the radial direction of its longitudinal central axis, wherein, even then the centered arrangement of the device on the first component, in particular in its receiving recess, is ensured by the elastic centering arrangement.

The tolerance compensation between the first component and the second component, by means of the device described here, is carried out, in particular, in the axial direction of the device, in particular in the axial direction of the fastening member, in particular in the axial direction of the base member, in particular in the axial direction of the compensating member, in particular in the axial direction of the longitudinal central axis, in particular in the axial direction of the screw member, by means of which the first component and the second component are fastened to each other and/or a third component is fastened to the first component and/or to the second component.

Mounting by means of the device is carried out in particular by arranging the device on the first component, in particular by inserting it into the receiving recess of the first component, and centering it in the nominal position on the first component, in particular in the receiving recess, by means of the elastic centering arrangement. Then the tolerance compensation between the first component and the second component is carried out. The second component is then attached to the first component and/or a third component is attached to the first component and/or the second component.

Mounting, by means of the device, is thus carried out, in particular, in such a way that the device is arranged on the first component, in particular by inserting it into the receiving recess and, for example, latching at least one holding structure formed as a latching member into the first component, for example into a latching opening of the first component. By means of the at least one holding structure, the device is held on the first component, and, by means of the elastic centering arrangement, it is thereby centered in the nominal position on the first component, in particular in the receiving recess, and in particular centered in the radial direction as described above. Subsequently, for example, the second component can be fastened to the first component, in particular by means of the screw member, and/or a third component can be fastened to the first component and/or to the second component, for example, wherein, by means of the device, the tolerance compensation between the first component and the second component is carried out simultaneously, in particular in the axial direction, as described above.

For this purpose, the screw member is inserted into the device and passed through it. In this case, the screw member comes into engagement with the driving member and a threaded member formed or arranged on the first component. If the screw member is twisted, for example clockwise, a torque is transmitted to the compensating member by the driving member, which causes a twist of the compensating member relative to the base member, whereby the compensating member moves out of the base member along the longitudinal central axis, especially in the direction of the second component. As soon as the compensating member has been screwed out of the base member to such an extent that a contact portion of the compensating member is in contact with the second component, a frictional torque between the second component and the contact portion exceeds the torque that can be transmitted by the driving member and the compensating member is no longer screwed out of the base member. The compensating member has thus taken up a position known as the compensating position.

By further screwing-in the screw member into the first component, in particular into the threaded member formed in the first component or arranged thereon, it is now possible, for example, to fasten the second component to the first component and/or to fasten a third component to the first component and/or to the second component without deforming the first component and the second component, since these are supported against each other by the device, in particular in the axial direction of the longitudinal central axis.

DESCRIPTION OF THE FIGURES

Embodiments of the invention are explained in more detail with reference to drawings. In which.

Parts corresponding to each other are provided with the same reference signs in all figures.

DETAILED DESCRIPTION

Figure 1:
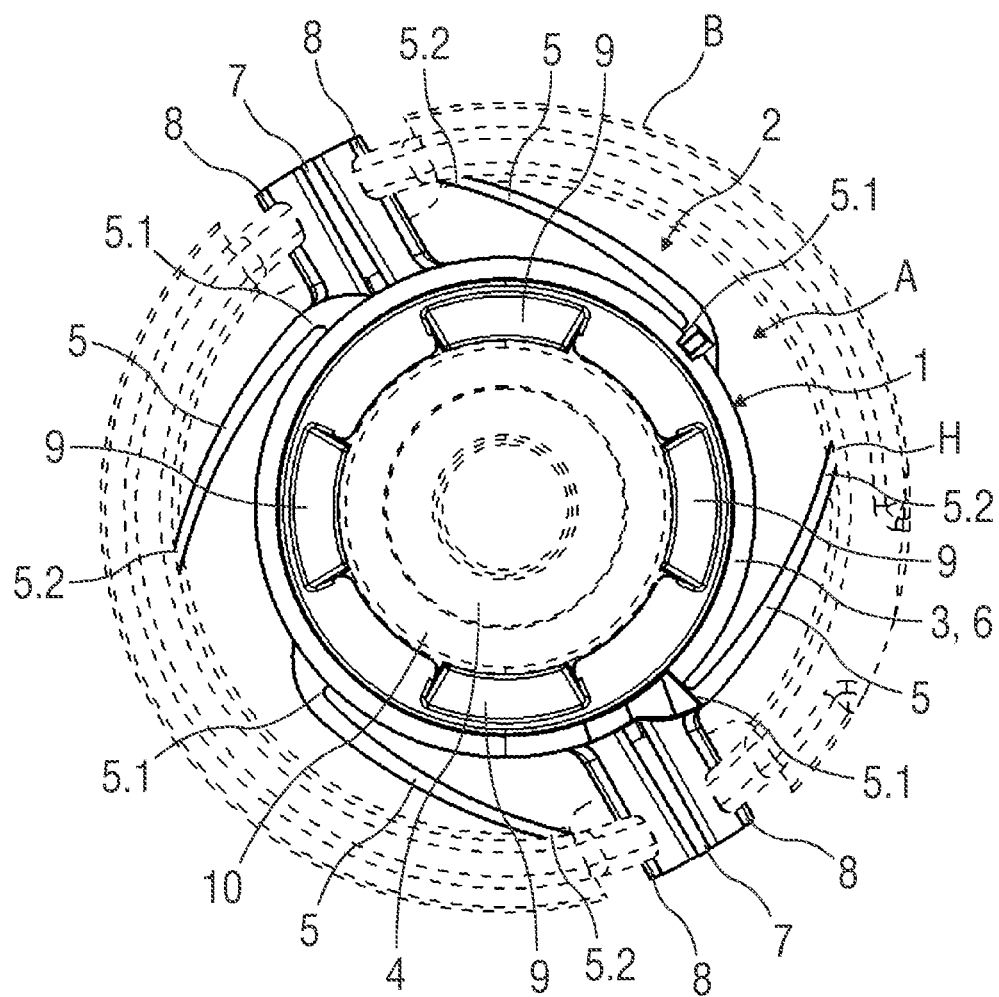
FIG. 1 shows a schematic plan view of a device arranged on a first component for compensating of tolerances between the first component and a second component, FIG. 2 schematically shows a perspective representation of the device arranged at the first component, FIG. 3 schematically shows a perspective representation of a fastening member, FIG. 4 schematically shows another perspective representation of the fastening member, FIG. 5 schematically shows a side view of the fastening member, FIG. 6 schematically shows the fastening member in top view, FIG. 7 schematically shows a further side view of the fastening member, FIG. 8 schematically shows a perspective representation of the device, FIG. 9 schematically shows another perspective representation of the device, and FIG. 10 schematically shows a perspective longitudinal sectional view of the device.
Figure 2:
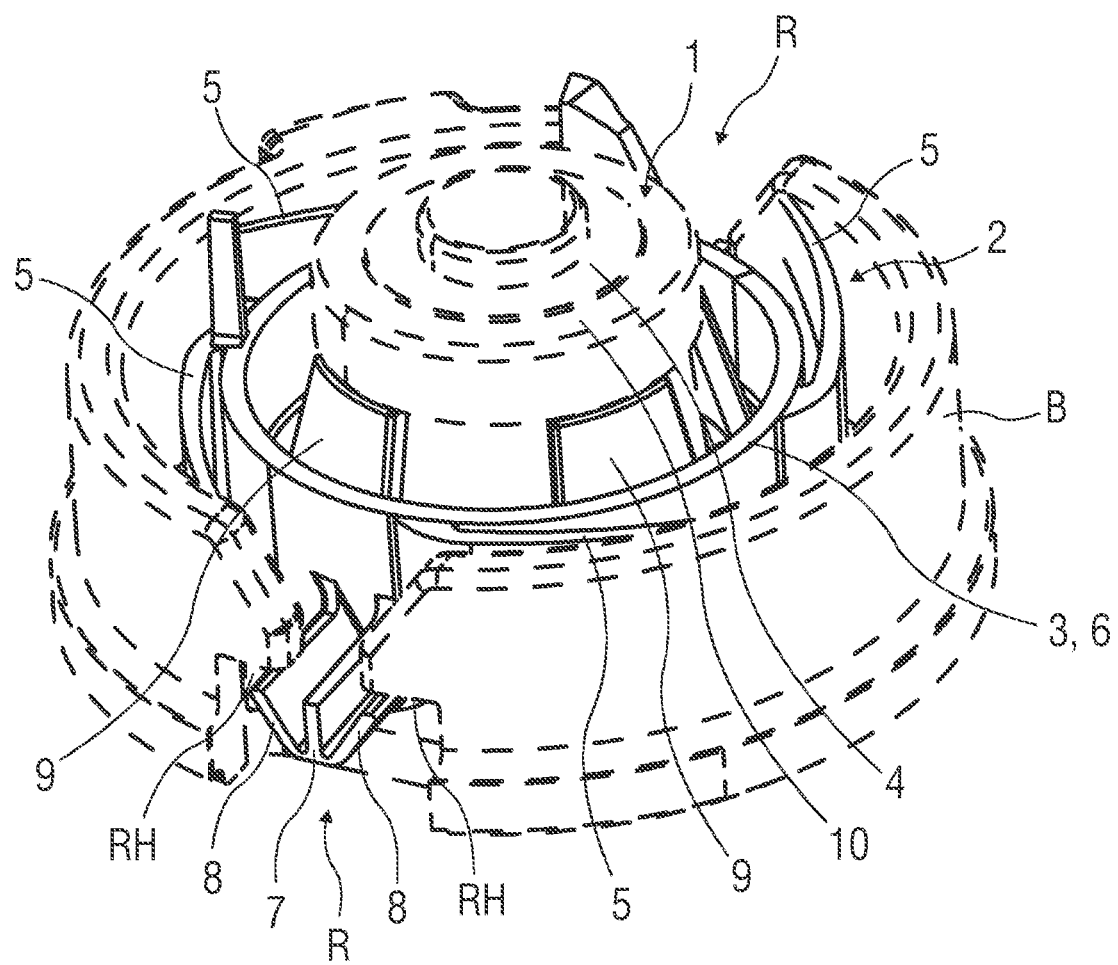

FIGS. 1 and 2 show schematic representations of a device 1 arranged on a first component B for compensating of tolerances between the first component B and a second component not shown, FIG. 1 showing this in a plan view and FIG. 2 showing this in a perspective representation. The device 1 is arranged here in a receiving recess A in the first component B.

The device 1 comprises an elastic centering arrangement 2 which, provided for centering the device 1 in a predetermined nominal position on the first component B, is especially formed for this purpose. By means of this elastic centering arrangement 2, the device 1 in the example shown is supported on an inner wall of the receiving recess A in the first component B and is thus held centered in this receiving recess A and thus in this predetermined nominal position by means of the elastic centering arrangement 2. In particular, a diameter of the elastic centering arrangement 2 in an unstressed state, i.e. in a state of the elastic centering arrangement 2 not tensioned against the elasticity of the elastic centering arrangement 2, at least equal to an inner diameter of the receiving recess A or larger, in particular slightly larger than this inner diameter of the receiving recess A, so that the elastic centering arrangement 2 is slightly elastically deformed and thus slightly tensioned by arranging the device 1 in the receiving recess A in order to keep the device 1 centered in the nominal position in the receiving recess A.

In addition, an upper edge of the elastic centering arrangement 2 rests against an opening-side receiving undercut H of the receiving recess A, so that a tilting of the device 1 is also prevented and the device 1 is also centered, in this respect, in the nominal position.

The elastic centering arrangement 2 is especially formed as an elastic contour and/or an elastic body. In the example represented here, this elastic centering arrangement 2 is a component of a fastening member 3, which is intended, in particular, for fastening the device 1 to the first component B. This means that, in the example represented here, the elastic centering arrangement 2 is formed on this fastening member 3, in particular formed together with it, for example, in an injection molding method, so that the fastening member 3 also includes the elastic centering arrangement 2.

In FIGS. 1 and 2, for reasons of clarity, only the fastening member 3 with the elastic centering arrangement 2 is represented with solid lines, while the first component B and the other components of device 1 are represented with dotted lines.

Figure 3:
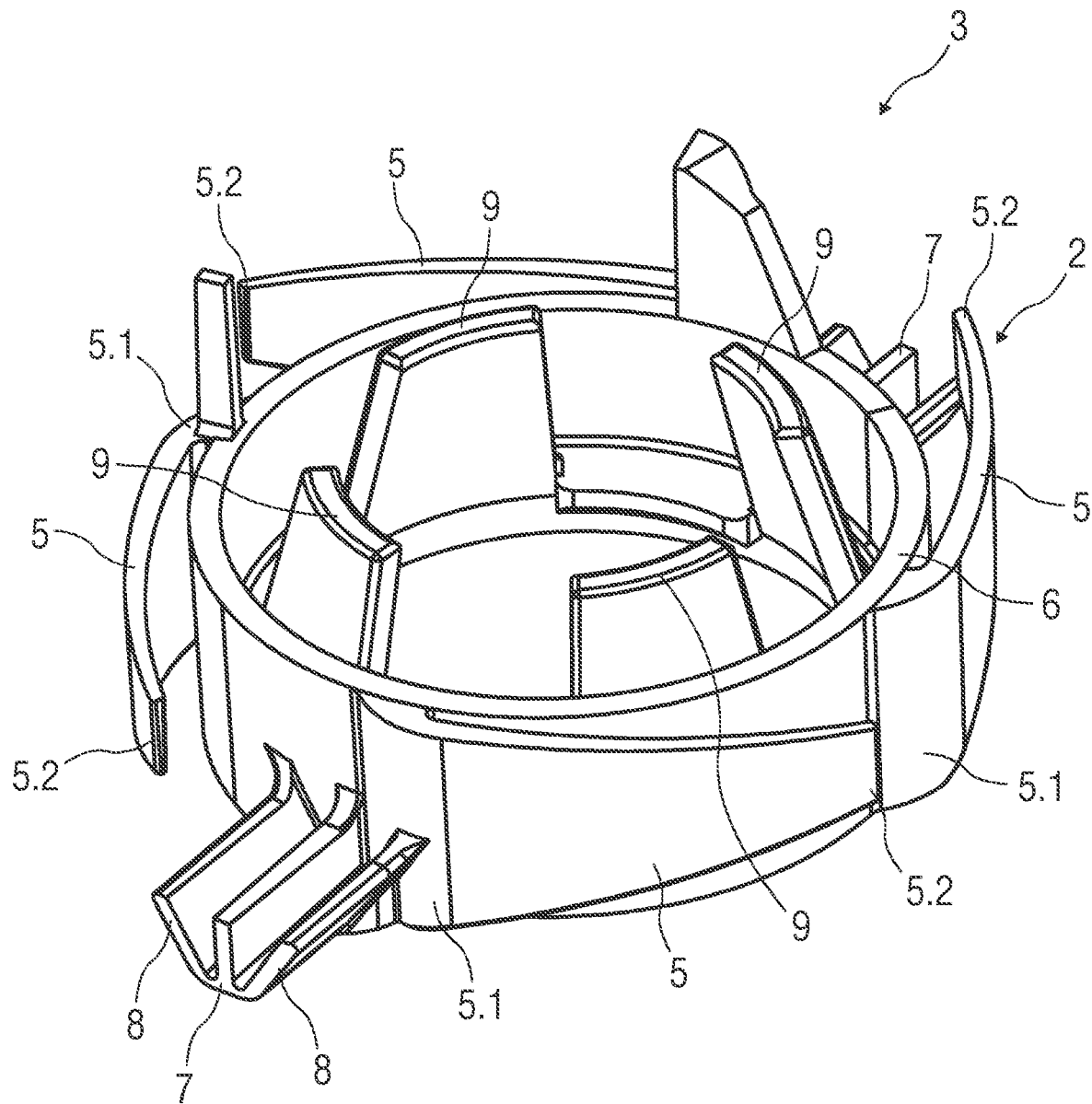
Figure 4:
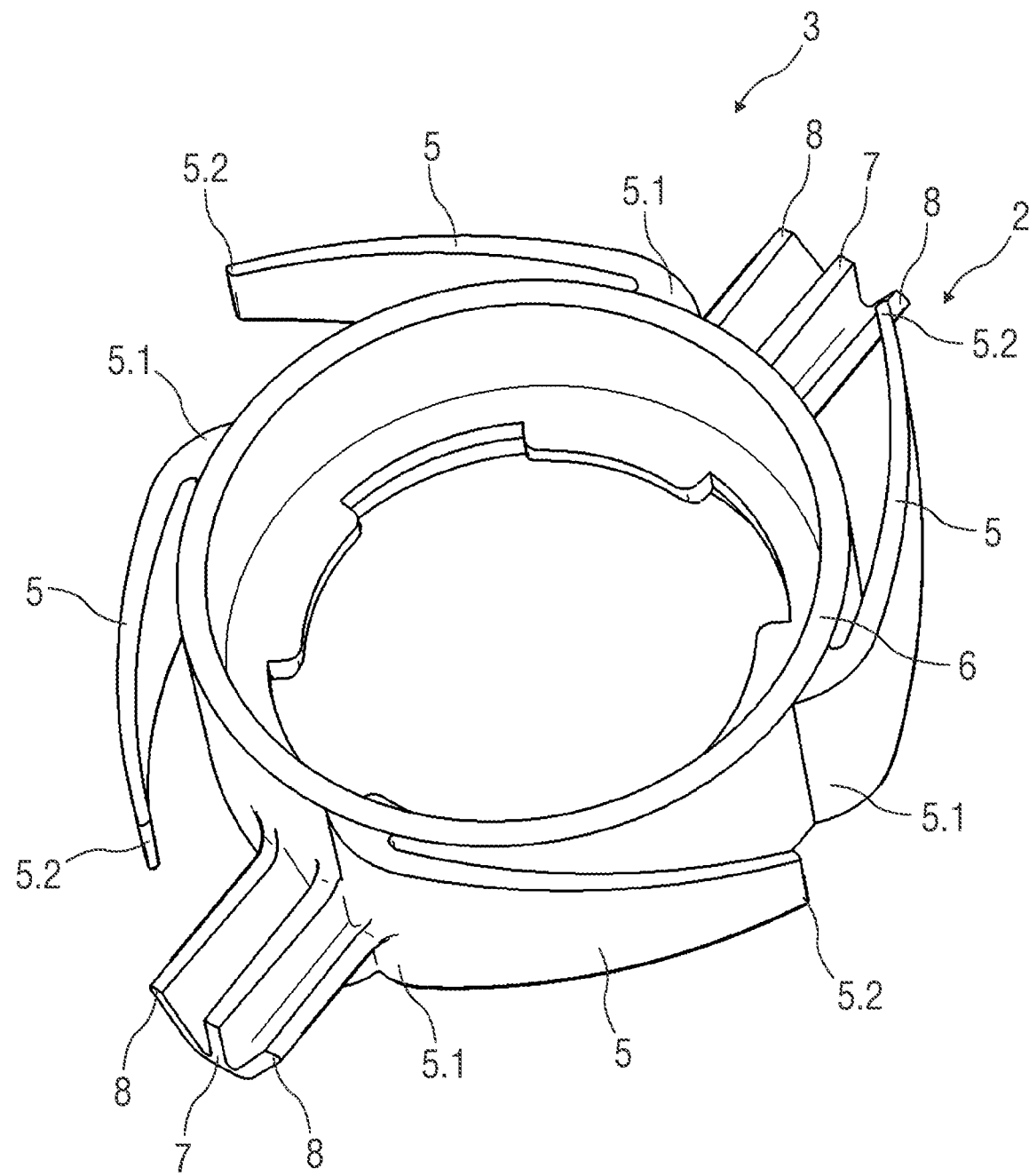
Figure 5:
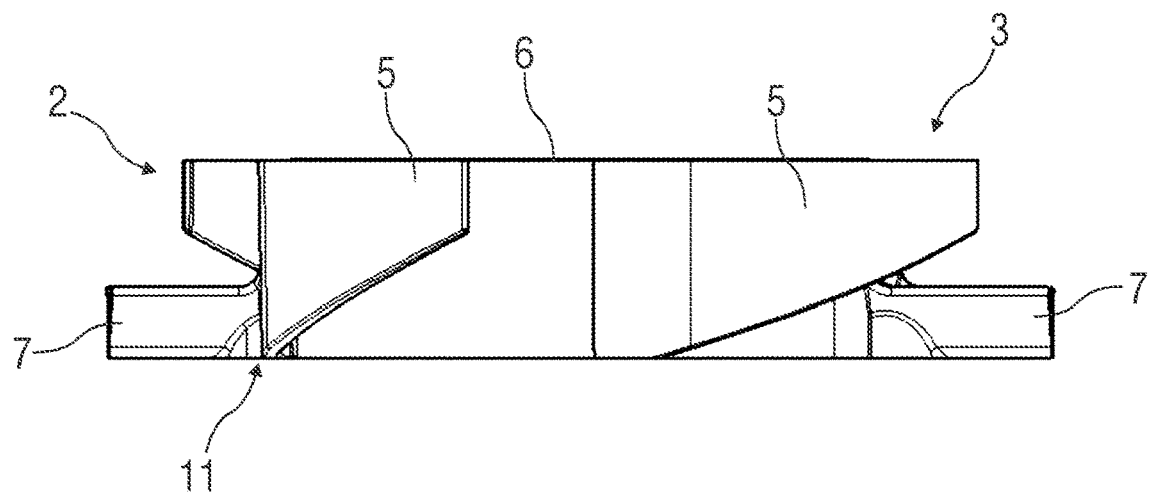
Figure 6:
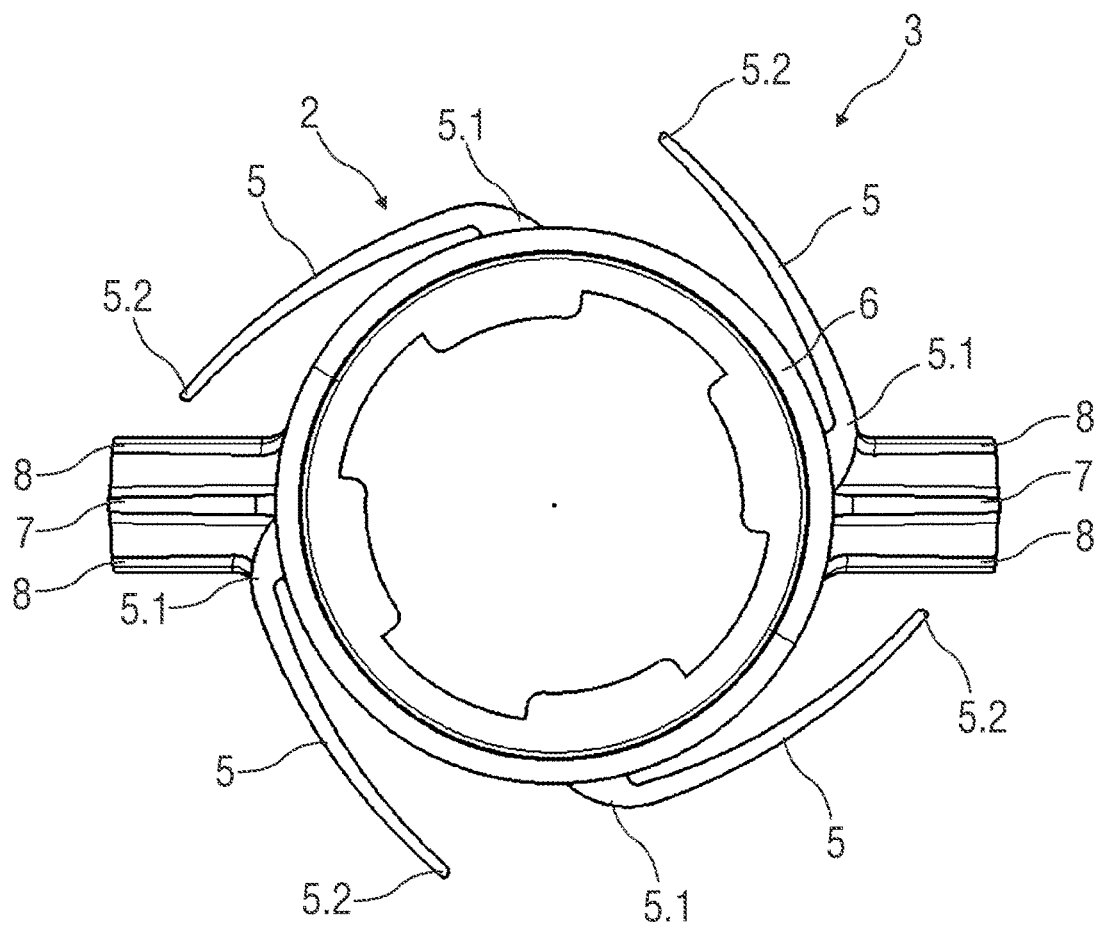
Figure 7:
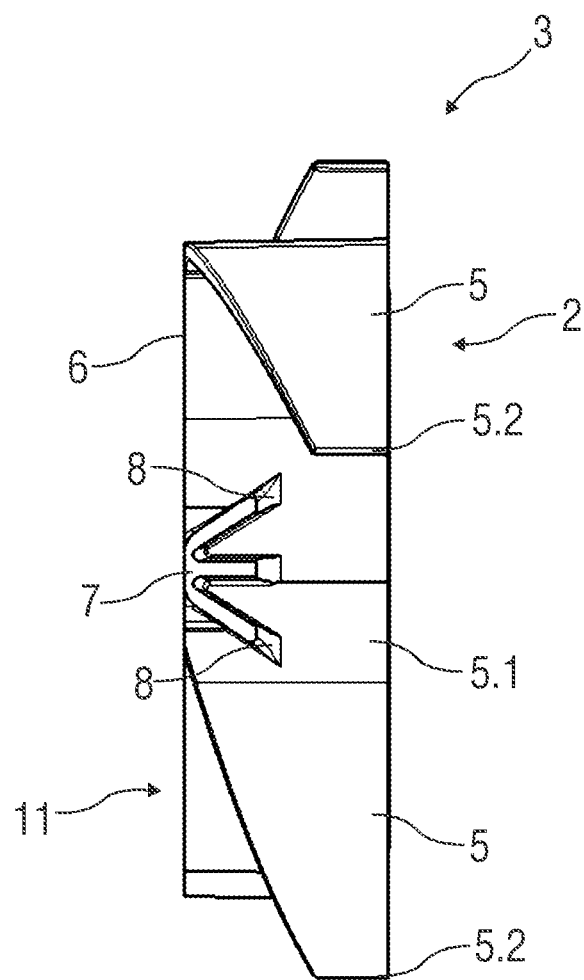

FIG. 3 shows a perspective representation of the fastening member 3 with the elastic centering arrangement 2. FIG. 4 shows another perspective representation of the fastening member 3 with the elastic centering arrangement 2. FIG. 5 shows a side view of the fastening member 3 with the elastic centering arrangement 2 and FIG. 6 shows the fastening member 3 with the elastic centering arrangement 2 in plan view. FIG. 7 shows another side view of the fastening member 3 with the elastic centering arrangement 2.

Figure 8:
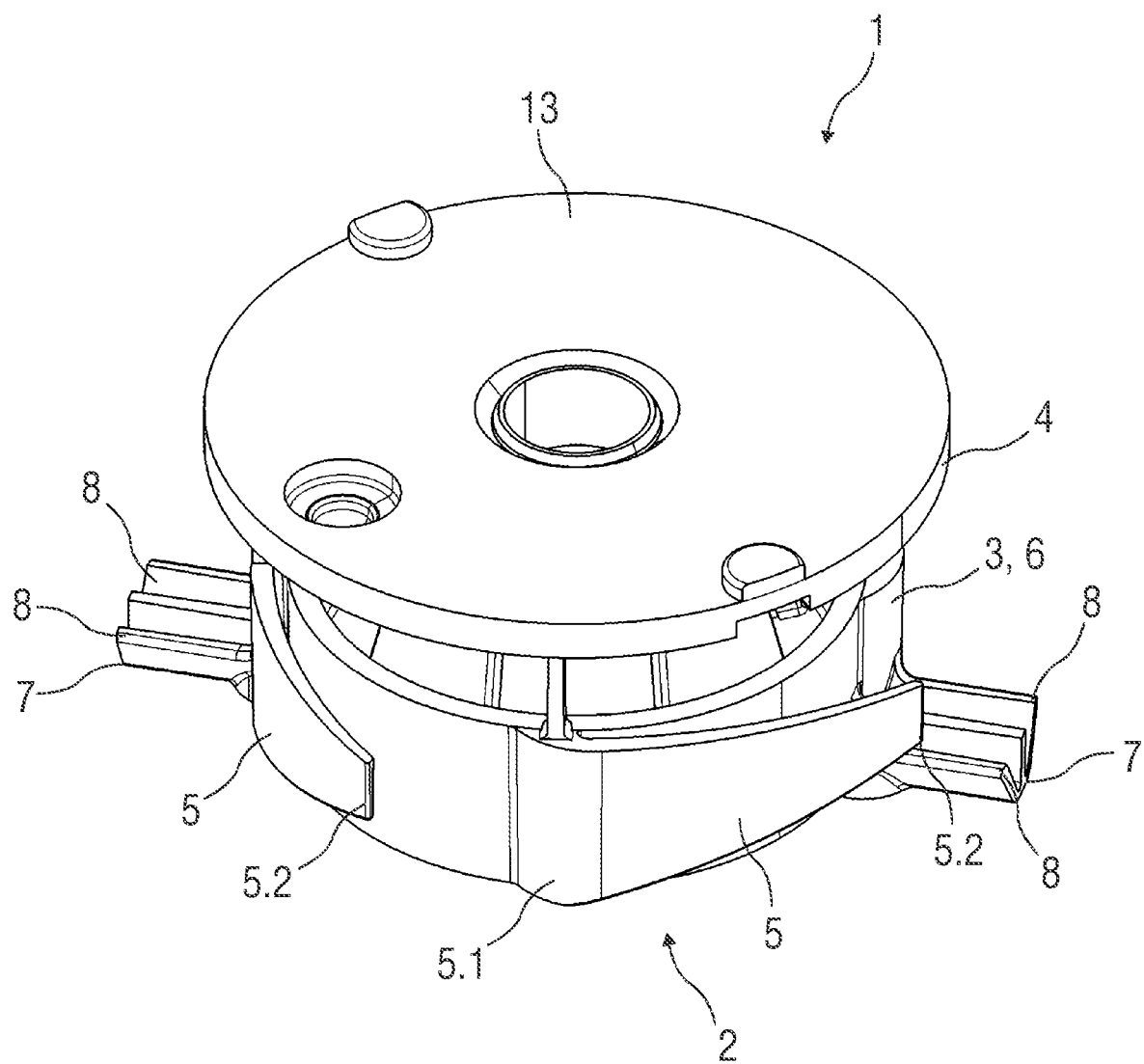
Figure 9:
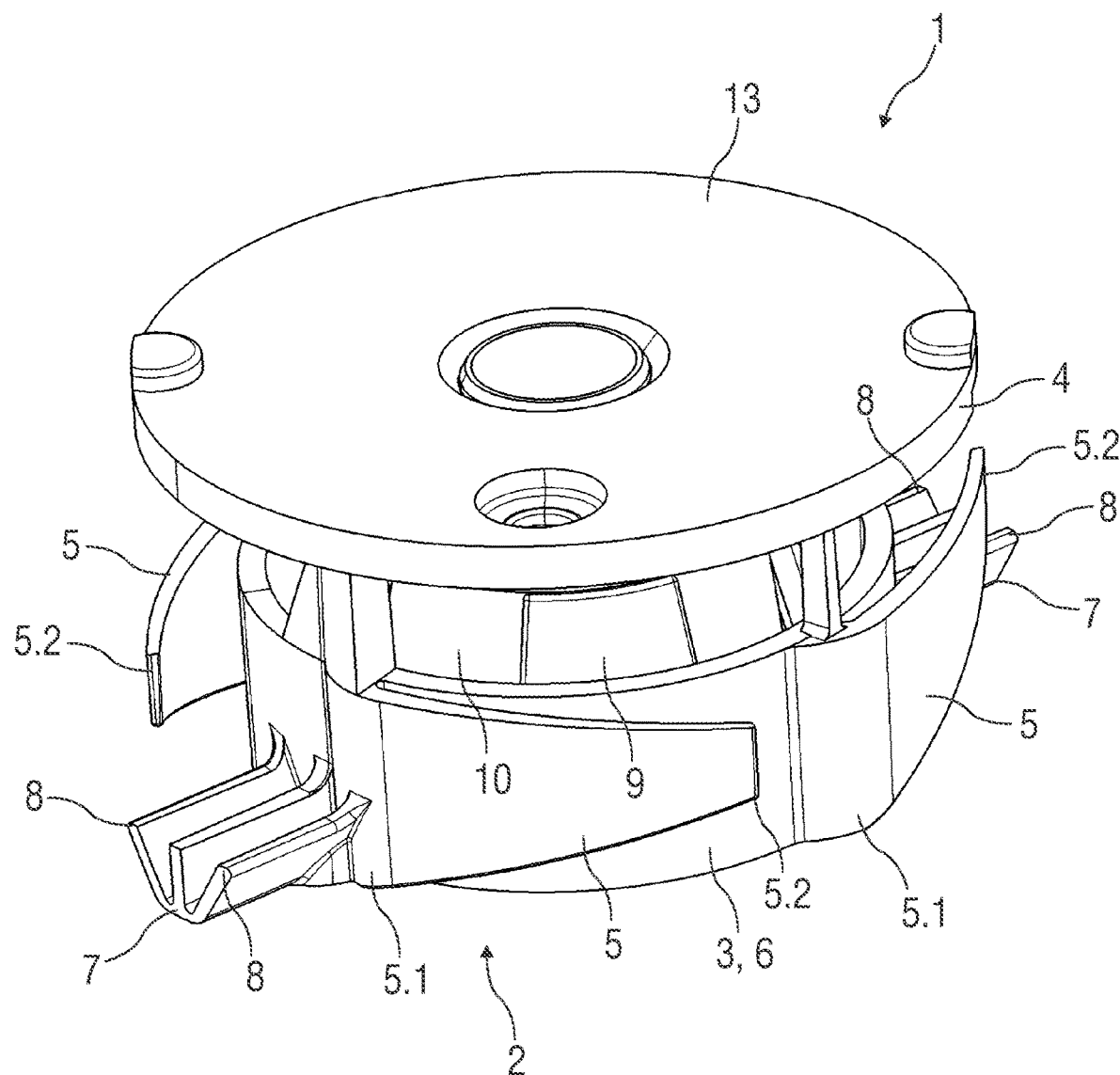
Figure 10:
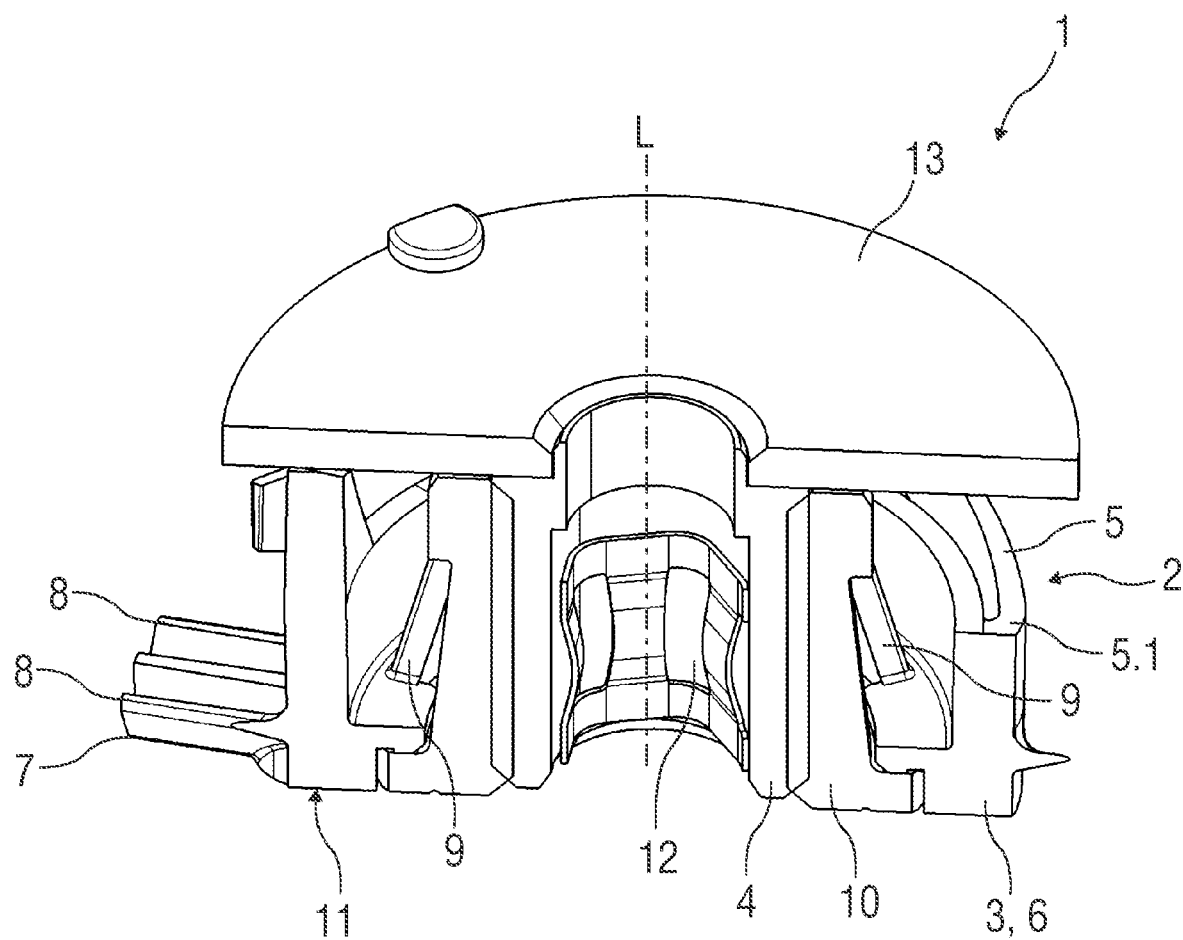

Device 1 is shown again in FIGS. 8 to 10, here for reasons of clarity without the first component B. FIGS. 8 and 9 show the device 1 in two different perspective views and FIG. 10 shows a longitudinal perspective view of the device 1. FIGS. 8 to 10 also show a compensating member 4 of device 1, which is not shown in FIGS. 1 and 2 for reasons of clarity.

In the represented example, the elastic centering arrangement 2 comprises a plurality of elastic centering members 5. In the embodiment represented here, these are four elastic centering members 5. These elastic centering members 5 are advantageously distributed over a circumference, in particular the outer circumference, of the fastening member 3, in particular evenly distributed, arranged or formed. This means that, in the represented example, the fastening member 3 comprises an, in particular annular and/or hollow cylindrical, base body 6, on the outer circumference of which the elastic centering members 5 are arranged or formed, advantageously distributed over the outer circumference, in particular uniformly distributed.

In the represented example, the elastic centering members 5 are each designed as a tongue, wherein a respective tongue root 5.1 is arranged on the outer circumference of the fastening member 3, in particular of the base body 6, and the respective tongue extends, at least substantially, in a circumferential direction of the fastening member 3, in particular of the base body 6. The respective tongue is thus curved in this circumferential direction. In the process, the tongue increasingly moves away from the fastening member 3, in particular from the base body 6, so that a tongue tip 5.2 of the respective elastic centering member 5 has a maximum radial distance of the respective elastic centering member 5 from the outer circumference of the fastening member 3, in particular the base body 6.

The elastic centering members 5 are thus each arranged in a spiral or spiral portion on the fastening member 3, in particular on its base body 6. They are thus each formed as a bending spring, in particular as a bending spring curved in the bending direction and thus in the spring tensioning direction. In the represented example, all elastic centering members 5 are aligned in the same circumferential direction. In other examples, the elastic centering members 5 can also be oriented in opposite directions.

In the represented example, the elastic centering members 5 are thus each in contact with the inner wall of the receiving recess A and thus support the device 1 against this inner wall, whereby the device 1 is held centered in the nominal position in this receiving recess A. For this purpose, the diameter of the elastic centering arrangement 2 formed by the elastic centering members 5 in the untensioned state of the elastic centering members 5, i.e. when the elastic centering members 5 are not elastically pre-bent, in particular are not bent towards the base body 6, is at least equal to or larger than the inner diameter of the receiving recess A or larger, in particular slightly larger, than this inner diameter of the receiving recess A, so that the elastic centering members 5 are slightly elastically pre-bent, in particular are slightly bent in the direction of the base body 6, by placing the device 1 in the receiving recess A, and are thus slightly tensioned to keep the device 1 centered in the nominal position in the receiving recess A.

In addition, the centering members 5 each rest with an upper edge on the opening-sided receiving undercut H of the receiving recess A, so that, as already described above, the tilting of device 1 is also prevented and device 1 is also held centered in the nominal position.

The fastening member 3 further comprises two holding structures 7 for arranging the device 1 on the first component B. In the represented example, these holding structures 7 are formed as latching members, in particular latching lugs, which are arranged or formed on the outer circumference of the fastening member 3, in particular the base body 6, and, in the represented example, protrude in the opposite direction. The first component B in this example, as shown in FIGS. 1 and 2, has corresponding latching openings R for latching the fastening member 3 and thus the device 1, which are formed in particular in a wall of the receiving recess A.

In the represented example, the latching openings R have a funnel-shaped insertion region and the holding structures 7, formed as latching members, on the fastening member 3 each have two lateral elastic wings 8, which are pressed together by inserting them into the respective funnel-shaped insertion region and expand again after passing through a funnel base opening of this funnel-shaped insertion region, as a result of which the respective holding structure 7 formed as a latching member rests against a latching undercut RH of the respective latching opening R, which is formed by a surrounding region of the funnel base opening. The fastening member 3 and thus the device 1 is therefore latched to the first component B.

As can also be seen from FIGS. 1 and 2, an outer diameter of the base body 6 of the fastening member 3 is considerably smaller than the inner diameter of the receiving recess A formed in the first component B for the device 1, so that although the device 1 is held on the first component B by the latching against the latching direction in which the described latching occurred, it would not be firmly fastened in the radial direction without the elastic centering arrangement 2 and would therefore be displaceable in particular radially in the direction of the latching openings R. This is prevented by the elastic centering arrangement 2. The device 1 is thus held in the predetermined nominal position by the elastic centering arrangement 2.

In the represented example, the fastening member 3 also has connecting formations 9 for connecting the fastening member 3 with a base member 10 of device 1. In the represented example, these connecting formations 9 are arranged inside the base body 6 of the fastening member 3 and are, in particular, integrally formed with it, in particular by injection molding method. In FIGS. 4 and 6, these connecting formations 9 are not represented for reasons of clarity.

FIGS. 8 to 10 show the entire device 1. The device 1 comprises the fastening member 3 with the elastic centering arrangement 2 and the hollow cylindrical base member 10, which is arranged in the fastening member 3 and is connected to the fastening member 3 by means of the connecting formations 9, in particular fastened thereto, and which defines a longitudinal central axis L and has an unshown internal thread on its inside, i.e. on a lateral surface of its internal hollow. In the present embodiment, the internal thread has a reverse orientation to an external thread of a screw member, for example, a left-hand thread.

The device 1 further comprises the hollow cylindrical compensating member 4, which is in threaded engagement with the base member 10, extends into the hollow of the base member 10 and has an external thread not shown on its outside. This external thread is in engagement with the internal thread of the base member 10. By a twist, the compensating member 4 can be moved along the longitudinal central axis L relative to the base member 10, i.e. out of or screwed into the hollow of the base member 10.

For the execution of the tolerance compensation, the compensating member 4 is thus screwed out of the basic member 10 until the compensating member 4 rests on the second component and the basic member 10 and/or the fastening member 3 connected to it rests on the first component B. For this purpose, the fastening member 3 can be moved even further in the engagement direction if the latching openings R are formed appropriately large, as shown in particular in FIG. 2, so that it then adjoins with a contact region 11 the first component B.

The unscrewing of the compensating member 4 is made possible by a driving member 12 in the form of a driving spring, which is arranged in an inner hollow of the compensating member 4 and is supported on a lateral surface of the hollow of the compensating member 4. The driving member 12 is in frictional engagement with the screw member passed through the device 1, i.e. through the hollows of the base member 10 and driving member 12, in order to transmit a torque exerted by the screw member to the compensating member 4.

Mounting by means of the device 1 is carried out, in particular, in such a way that the device 1 is arranged on the first component B in the manner described above, i.e. by inserting it into the receiving recess A and latching the retaining structures 7 formed as latching members into the latching openings R. Then, for example, the second component can be fastened to the first component B by means of the screw member and/or a third component can be fastened to the first component B and/or second component, whereby the tolerance compensation between the first component B and the second component is carried out simultaneously by means of device 1.

For this purpose, the screw member is inserted into the device 1 and passed through it. Here the screw member comes into engagement with the driving member 12 and a threaded member formed or arranged on the first component B. If the screw member is twisted, for example clockwise, a torque is transmitted to the compensating member 4 by the driving member 12, which causes a twist of the compensating member 4 relative to the base member 10, whereby the compensating member 4 moves out of the base member 10 along the longitudinal central axis L. As soon as the compensating member 4 has been turned out of the base member 10 to such an extent that a contact portion 13 of the same is in contact with the second component, a frictional torque between the second component and the contact portion 13 exceeds the torque transmittable by the driving member 12 and the compensating member 4 is not turned out of the base member 10 any further. The compensating member 4 has thus assumed a position referred to as the compensating position.

By further screwing-in of the screw member into the first component B, in particular into the threaded member formed in the first component B or arranged thereon, it is now possible, for example, to fasten the second component to the first component B or to fasten a third component to the first component B and/or to the second component without shaping the first component B and the second component, since they are supported against each other by device 1.

The holding of the device 1 in the nominal position by means of the elastic centering arrangement 2 facilitates, in particular, the arranging of the screw member and an arranging of a tool at the screw member, if device 1 is arranged in an unfavorable mounting position, in which no direct view of device 1 and/or the first component B and/or the screw member is possible, whereby, for example, the screw member has to be inserted accordingly without direct view into device 1 and the tool has to be guided without direct view to the screw member, in particular to a screw head of the screw member.

The elastic centering arrangement 2 is especially formed in such a way that the actual function of the device 1, i.e. the compensating of tolerances between the first component B and the second component, is not affected by the elastic centering arrangement 2. In particular, the elastic centering arrangement 2 is formed in such a way that lateral forces caused by the elastic centering arrangement 2, in the example shown by the elastic centering members 5, do not negatively influence the tolerance compensation, in particular the function of the device 1, in particular the unscrewing of the compensating member 4. Therefore, the elasticity of the elastic centering arrangement 2, in the example shown the elasticity of the elastic centering members 5, is advantageously predetermined in such a way that a force required for the elastic shaping of the elastic centering arrangement 2, in particular of a region of the elastic centering arrangement 2 which counteracts a weight force of the device 1, is just sufficient to keep the device 1 in the nominal position against its weight force. In the example shown, this relates in particular to the respective elastic centering member 5. The elastic centering arrangement 2 is thus advantageously formed in such a way that the spring forces of the elastic centering arrangement 2, resulting from the elasticity, only compensate for the weight of the device 1 and thus keep the device 1 in equilibrium in the nominal position, especially on the first component.

The elastic centering members 5 are in particular arranged and formed in such a way, in particular in such a number and distribution over the circumference, in particular outer circumference, of the base body 6 of the fastening member 3 that, in the state of the device 1 arranged on the first component B, a polygon of forces acting through the centering members 5 on the first component B always remains closed and/or centering forces of the elastic centering members 5 always compensate each other. As a result, the device 1 is safely centered in the nominal position. In addition, negative influences on the function of the device 1, i.e. on the execution of the tolerance compensation, are avoided.

REFERENCE SIGN LIST 1 device
2 centering arrangement
3 fastening member
4 compensating member
5 centering member
5.1 tongue root
5.2 tongue tip
6 base body
7 holding structure
8 wing
9 connecting formation
10 base member
11 contact region
12 driving member
13 receiving portion
A receiving recess
B component
H receiving undercut
L longitudinal central axis
R latching opening
RH latching undercut

What is claimed is:

1. A device for compensating of tolerances between a first component and a second component, wherein the device comprises an elastic centering arrangement which is provided for centering the device in a nominal position on the first component,
   wherein the elastic centering arrangement comprises a plurality of elastic centering members,
   wherein the elastic centering members are each formed as a tongue, wherein a respective tongue root is arranged on an outer circumference of the fastening member, the respective tongue extends in a circumferential direction of the fastening member and a tongue tip has a greatest radial distance from the outer circumference of the fastening member.

2. The device according to claim 1,
   wherein an elasticity of the elastic centering arrangement is predetermined in such a way that a force, which is required for elastically shaping the elastic centering arrangement or a respective region of the elastic centering arrangement opposing a weight force of the device, is just large enough to keep the device in the nominal position against its weight force.

3. The device according to claim 1,
   wherein the elastic centering arrangement is arranged or formed on the fastening member provided for fastening the device to the first component.

4. The device according to claim 1,
   wherein the elastic centering members are arranged and formed in such a way that, in the state of the device arranged on the first component, a polygon of forces acting through the centering members on the first component always remains closed and/or the centering forces of the elastic centering members always compensate each other.

5. The device according to any of claim 1,
   wherein the fastening member comprises at least one holding structure, including a mounting clip and/or a latching member, for arranging the device on the first component, by clipping and/or latching on the first component.

6. The device according to claim 1,
   further comprising a hollow cylindrical base member defining a longitudinal central axis, and a hollow cylindrical compensating member in threaded engagement with the base member.

7. The device according to claim 6,
   wherein the fastening member is firmly connected to the base member or is formed integrally therewith.

8. The device according to claim 7,
   wherein
   the compensating member can be moved from a starting position into a compensating position by a twisting relative to the base member,
   a screw member extending through an inner hollow of the base member and an inner hollow of the compensating member is provided for being screwed to the first component,
   a driving member is arranged in the inner hollow of the compensating member, which driving member is in frictional engagement with the screw member, guided through the hollow, in such a way that a torque applied by the screw member can be transmitted to the compensating member.

\* \* \* \* \*